United States Patent [19]

Koike

[11] Patent Number: 4,800,305
[45] Date of Patent: Jan. 24, 1989

[54] PULL STRING MECHANISM IN A PULL STRING TYPE SOUND REPRODUCING DEVICE

[75] Inventor: Eishi Koike, Sagamihara, Japan
[73] Assignee: Ozen Corporation, Tokyo, Japan
[21] Appl. No.: 192,325
[22] Filed: Apr. 28, 1988
[30] Foreign Application Priority Data Apr. 30, 1987 [JP] Japan .................. 62-65575[U]

[51] Int. Cl.[4] .................. G11B 27/10; G11B 3/78; G11B 17/00
[52] U.S. Cl. .................. 369/67; 369/63
[58] Field of Search .................. 369/63, 65, 67, 66

[56] References Cited

U.S. PATENT DOCUMENTS

| | | | |
|---|---|---|---|
| 1,979,067 | 10/1934 | Franklin | 369/67 |
| 3,796,284 | 3/1974 | Zeigner et al. | 369/63 |
| 4,004,815 | 1/1977 | Watanabe | 369/63 |
| 4,404,667 | 9/1983 | Koike | 369/67 |
| 4,547,873 | 10/1985 | Koike | 369/67 |

FOREIGN PATENT DOCUMENTS 46778 10/1983 Japan .
19275 1/1984 Japan .

*Primary Examiner*—Steven L. Stephan
*Attorney, Agent, or Firm*—Arnold S. Weintraub

[57] ABSTRACT

A pull string mechanism for a pull string type sound reproducing device utilizes a string supporting member which is resiliently movable only in an upward and downward direction. The string supporting member is disposed adjacent a pull out hole, such that the path of the pull string from the pull out hole, via the string supporting means and a bobbin for taking up and paying off the pull-string can follow a crank shaped path with the angle of turning being not larger than a right angle.

2 Claims, 3 Drawing Sheets

PULL STRING MECHANISM IN A PULL STRING TYPE SOUND REPRODUCING DEVICE

BACKGROUND OF THE INVENTION

1. Field of the Invention

This invention relates to a pull string mechanism in a pull string type sound reproducing device wherein the energy spent for pulling a string connected to a constant torque spring is initially stored in a constant torque spring, and thereafter the stored energy is utilized to reproduce the recorded sounds.

2. Description of the Prior Art

As prior art, there is an invention disclosed in U.S. Pat. No. 4,004,815 corresponding to Japanese Utility Model Publication No. Sho 58(1983)-28408 as, generally, shown by FIGS. 5 and 6 of the attached drawings.

This device comprises an upstanding center shaft 2 disposed in a casing 1. A rotary member 3 disposed around the shaft 2 is resiliently supported and is axially moveable along the shaft by a stylus force spring 4. Alongside the rotary member 3 a constant torque spring 5 is disposed so as to energize the rotary member 3 in the direction of rotation. The shaft, also, carries thereon a turntable 6 and a bobbin 7 which are rotatable integrally with the rotary member 3.

The device, also, includes, a pull string 8, one end of which is attached to the bobbin 7, and the other end of which is extended outside the casing through a pull-out hole or opening 16 positioned below the level of the turn table 6, and a spring 9 for sustaining the string so that the string 8 does not contact the turntable 6 during the time when the string 8 is not being pulled and not in a stretched state.

The device is further equipped with a rotatable tone arm 14 which abuts the cone head 11 of the speaker cone 10 fixed to the casing 1 and is supported in such a manner that a sound reproducing stylus 12 can engage the record disc 13 under the resilient force imparted by the stylus force spring 4 of the turn table 6. A return spring 15 urges the tone arm 14 toward the starting point of sound reproduction. The device, also, includes a governor 18 which regulates the rotating speed of the record disc 13.

The device operates in the following manner:

The constant torque spring 5 is wound up around the rotary member 3. Then the rotary member 3 is ready for rotation.

When the rotary member 3 rotates, the turntable 6 and the record disc 13, also, rotate together. When the rotating speed of these members is too fast, the speed of rotation is regulated by the governor 18.

During rotation, the tone arm 14 travels toward the center of the record disc 13 accompanying the reproduction stylus 12. The motion of the stylus 12 transmits the sounds to the cone head 11 so as to be mechanically amplified by the speaker cone 10, since the stylus is kept in contact with the record disc 13 while the tone arm is kept in contact with the cone head.

When the constant torque spring 5 completely returns to its original un-loaded state, the pull string 8 is pulled again to energize the constant torque spring 5 for the next playing. The pull string 8, in the pulling motion, however, is inevitably stretched slantedly downwardly toward a level lower than the turntable 6 and urges the record disc 13 to move downward away from the tip end of the reproduction stylus 12. Since the tone arm 14, which is integral with the reproduction stylus 12, has been moved to the end point of sound reproduction by virtue of the friction between the reproduction stylus 12 and the record disc 13, absence of friction between the two members, as stated above, will allow the tone arm 14 and the stylus to move to the starting point of sound reproduction. Thus the device is now ready for next playing.

There is other prior art as disclosed by Japanese examined Patent Publication No. Sho 58(1983)-46778 and U.S. Patent Application Ser. No. 428,000 (abandoned) corresponding to Japanese unexamined Patent Publication No. Sho 59(1984)-19275 and U.S. Pat. No. 4,547,873.

In order to repeat the above operation in those prior art devices, the pull string must be securely and tightly wound around the bobbin disposed on the record disc, when the last reproduction has been completed. Otherwise, the pull string will run off outside the bobbin so that it either makes it difficult to sufficiently energize the constant torque spring for the next playing or the string may wind itself around some other undesired portions of the device so as to be impossible to pull out the string, or sometimes, even to energize the constant torque spring.

Such problems may be solved by widening the upper flange of the bobbin. However, a widened flange bobbin would abut the tone arm when the tone arm arrives at the portion somewhat adjacent to the end point of sound reproduction. This makes it necessary to enlarge the diameter of the record disc in order to ensure the length of time of sound reproduction is the same as that already accomplished by the prior art device. However such remedial ways make it difficult to minimize the overall size of such devices.

SUMMARY OF THE INVENTION

According to the present invention, a pull string mechanism is constructed in such a manner that a means for supporting the pull string, having a construction for supporting the pull string, and being resiliently reciprocally moveable only along the center shaft, is disposed in the casing at the portion adjacent to the through hole for pulling out the string and at a level higher than the upper face of the record disc. In this manner the pull string, being pulled by passing through the hole, can be guided along the path taking an almost right angle at each turning point akin to a crank shape. Since the pull string is guided along the path following an acute angle, akin to a crank shape, by passing through the string supporting means and the hole for guiding the string, and further since the string supporting means is permitted to move the string only in an upward or downward direction, but not in a horizontal direction, sufficient resistance is imparted to the string when it is moved, due to the deflected path to be followed, thereby a suitable tension is imparted to the string being pulled. Consequently, the pull string can be securely and tightly wound up around the bobbin without any undesirable loosening. Since the present invention is able to apply suitable frictional resistance to the string when the string is wound around the bobbin, as explained above, the pull string can be imparted with suitable tension and, thereby, there remains no fear that the pull string comes to be loosely wound up around the bobbin above the turn table.

In addition, since the string supporting member is, also, lowered when the string is being pulled, the record disc is, also, pulled down against the stylus force. Simultaneously, the tone arm is allowed to travel toward the starting point of sound reproduction. While the device is reproducing the recorded sound, the pull string supporting means will raise the pull string and thereby prevent the pull string from contacting the record disc.

According to the prior art devices, it was inevitable to reduce the bobbin size when the reproducing device is required to be made smaller in size. Thus there is the fear that the pull string is apt to run off its path if the string has been loosely wound. On the other hand, since the pull string according to the present invention can be pulled under adequate tension when it is wound around the bobbin and it can be tightly wound with almost no fear of running off its path. This enables the overall device to be reduced in size.

DETAILED DESCRIPTION OF THE PREFERRED EMBODIMENTS

Figure 1:
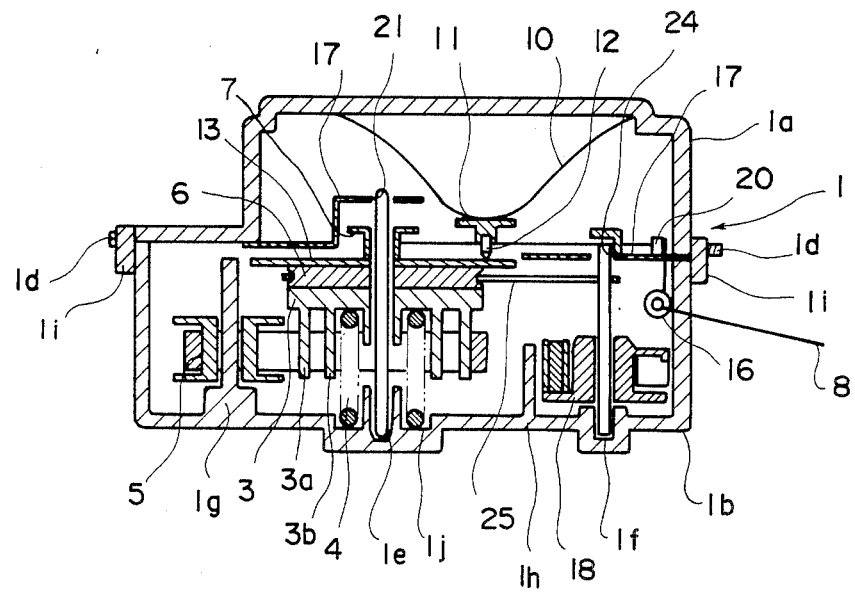
FIG. 1 is a sectional front view of a preferred embodiment of the device of the present invention.

FIGS. 1 through 4 show a preferred embodiment according to the present invention. In the drawings, there is denoted a casing 1, which comprises a chassis 1b, a housing 1a covered on the chassis 1b and a sub-chassis 17 disposed so as to be interposed the chassis 1b and the housing 1a.

The casing 1 is fabricated by plastic molding. A plurality of slits 1c are opened on the upper face of the housing 1a and each of a pair of coupling projections 1d is disposed on each lengthwise end of the housing 1a for the purpose of coupling the housing 1a to the chassis 1b.

Attached to the reverse side of top plate of the housing 1a is a speaker cone 10 with its cone head 11 directed downwardly.

Integrally attached to the chassis 1b are upwardly facing bearings 1e and 1f; projecting shaft 1g; a cylindrical portion 1h concentrically surrounding the bearings; a pair of locking members 1i coupled to the coupling projections, and a coil spring receiving groove 1j concentrically surrounding the bearing 1e. The elements are integrally formed by means of plastic molding or the like.

The sub-chassis 17 is provided with a first downwardly facing bearing 21 and a second downwardly facing bearing 24, each being disposed just above the bearings 1e and 1f, respectively.

An upstanding shaft 2 is disposed in the casing 1, and is supported at its lower end by the bearing 1e and at its upper end by the bearing 21. Attached to the shaft 2 is a rotary member 3 which is movable in an axial direction. The reverse face of the rotary member 3 is provided with an annular reel 3a and a cylindrical member 3b located inside the reel 3a, both being integral and concentric with each other and with the shaft 2.

The reel 3a is cut in the same direction as the shaft 2 so as to form a slit (not shown). The rotary member 3 is resiliently supported by a coiled stylus force spring 4 which is disposed on the chassis 1b while being received in the coil spring receiving groove 1j.

A constant torque spring 5 is supported by inserting it around the uprightly projecting shaft 1g. The constant torque spring 5 functions to energize the rotary member 3 to the direction of rotation. A lengthwise end portion of the constant torque spring is fixed on the cylinder 3b and is guided outwardly through the slit, such that the constant torque spring 5 is wound around the reel 3a, the direction of the winding being that for driving the rotary member.

The constant torque spring 5 is wound up around the reel 3a as set forth such that it repulses in the direction of unwinding, to which reel 3a; the rotary member 3, and the constant torque spring 5 are directly connected. In addition, the turn table 6 and bobbin 7 are axially stacked around the shaft 2, one after another, such that they are integral with the rotary member 3.

A record disc 13 carrying thereon at least one record groove and having a starting point and end point of sound reproduction are laid on the record disc 13, and the turn table 6 is integral with the record disc 13. On the side face of the chassis 1b, and at the position lower than the level of the upper face of the record disc 13 supported at the upper position by the stylus force spring 4, a pull out hole 16 is defined. A pull string 8 has one end attached to the side face of the bobbin 7, while the other end of the string is guided to extend outside the casing through the pull out hole 16.

Figure 2:
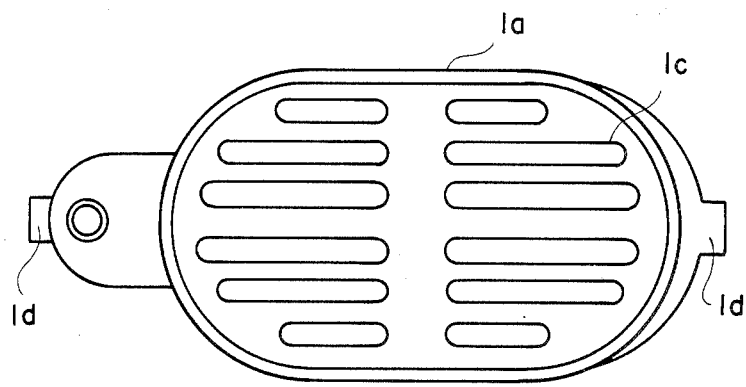
FIG. 2 is a plan view of the device hereof.
Figure 3:
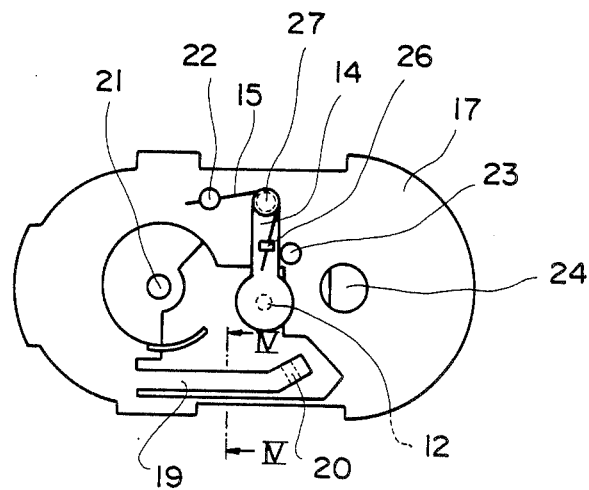
FIG. 3 is a plan view of the sub-chassis of the present invention.
Figure 4:
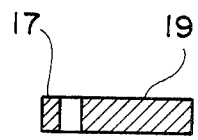
FIG. 4 is a sectional view taken along line IV—IV of FIG. 3.
Figure 5:
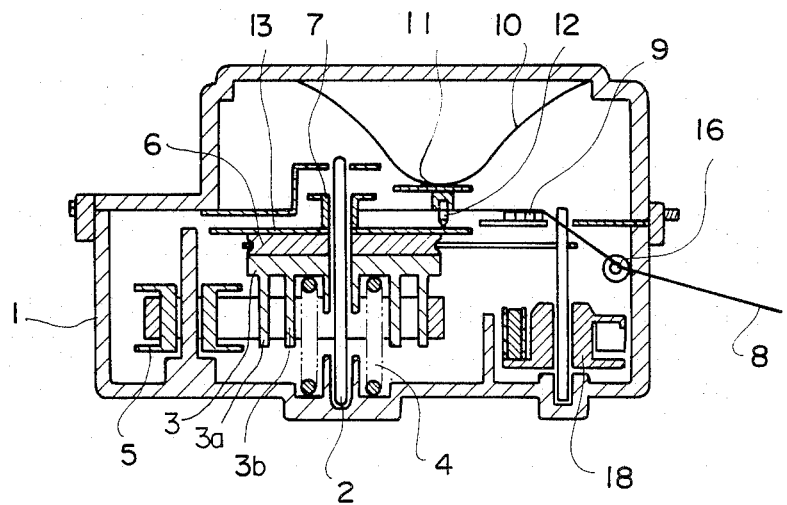
FIG. 5 is a sectional front view of the prior art device.
Figure 6:
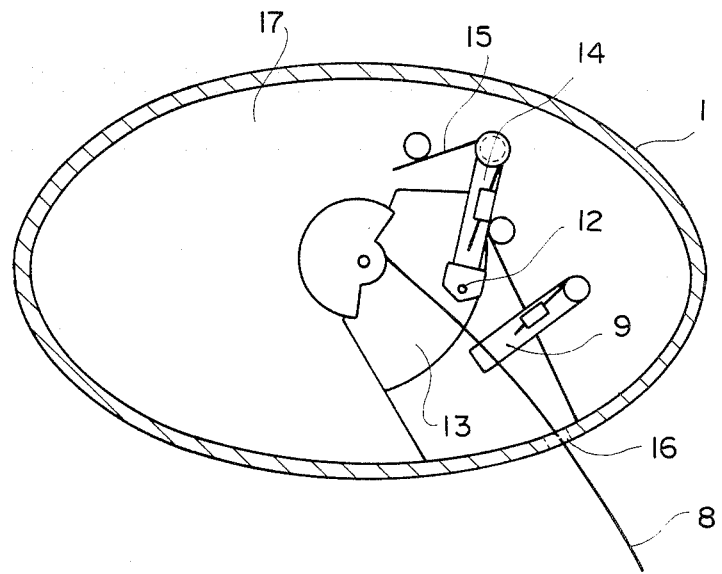
FIG. 6 is a plan view of the prior art device.

As shown in FIG. 3, a tone arm 14 has a tip end portion constituting a pickup, to which a sound reproducing stylus 12 is attached facing downwardly. The tone arm 14 is attached around a projection 27 so that its pickup portion can make a swinging motion. The back side of the pickup portion, at the forward end of the tone arm 14, contacts the cone head 11 of the speaker cone 10, while the tip end of the reproducing stylus 12 is constructed to contact the upper face of the record disc 13 by the resilient force imparted by the stylus force spring 4, as shown in FIG. 2. In addition, the tone arm 14 is formed to have a large width at its back side portion so that it can constantly contact the cone head 11 at a constant pressure, during playing. A return spring 15 normally urges the tone arm 14 toward the end point of sound reproduction.

This return spring 15 is wound, at its halfway portion, around the projection 27 so that it can urge the tone arm 14 toward the starting point of sound reproduction. One end of the return spring 15 rests on the projection 22 on the tone arm 14 and the other end rests on the projection 26 on the tone arm 14.

A projection 23 is disposed on the sub-chassis 17 so as to stop the tone arm 14 at the starting point of sound reproduction.

The return spring 15 has a resilient force which is somewhat weaker than the frictional force generated by the stylus force spring 15 between the reproduction stylus 12 and the upper face of the record disc 13, but it is strong enough to immediately move the tone arm to the starting point of sound reproduction as soon as the frictional force has been taken off.

As shown in FIG. 1, a governor 18 acts to regulate the rotation speed of the turn table 6. This governor 18 is supported by the bearings 1f and 24 and is correlated to the turn table 6 by means of a resilient belt 25.

If the turn table rotates at a speed faster than a predetermined one, the governor 18 moves radially outwardly and will contact the inner face of the cylinder 1h. This results in friction between the governor 18 and the cylinder 1h and thereby regulates the speed of rotation. A supporting means 19 is integrally fabricated with the sub-chassis 17. The free tip end of the supporting means is provided with a pipe-like string supporting member 20 through which the string 8 can pass to extend outside.

Since the supporting means 19 is fabricated as a type of cantilever flat spring having a large width and thin thickness, it can be resiliently bent around its fixed base portion, though it cannot substantially be deformed in a transverse direction. In addition, since the distance, from the fixed root portion of the supporting means 19 is contiguous with the sub-chassis 17 to the string supporting cylindrical member 20, is sufficiently longer as compared with the transverse width of the supporting means 19, such that the travelling length in the upward and downward movement of the string supporting cylindrical member 20 can be made sufficiently large, even if the extent of the deformation at the root of the string supporting means 19 is small.

Moreover, the string supporting member 20 is mounted adjacent to the string pull out hole 16 and at a position higher than the level of the upper face of the record disc 13, so that the string 8 follows a path which turns at an angle not larger than a right angle.

Now, explanation will be made on the operation of the device according to the present invention.

If the constant torque spring 5 of the device has already been wound around the rotary member 3, the rotary member is ready for rotation effected by the repulsion force imparted by the constant torque spring 5. On rotating the rotary member 3, the related turn table 6, record disc 13 and the bobbin 7 rotate with the rotary member 3, while the rotation speed of these members is regulated, in a suitable manner, by the governor 18. Then, the reproduction stylus 12 runs relatively along the recorded groove of the record disc 13. Thus, the reproduced vibration can be transmitted to the cone head 11 and mechanically amplified by the speaker cone 10. Concurrent with this reproduction, the pull string 8 is taken up around the bobbin 7. Since the pull string 8 must pass through both the string supporting means 20 and the pull out hole 16 and moves along the path like a crank shape, there arises sufficient friction between the string and these related members, i.e. the string supporting member and string put out hole 16. In addition, since the string supporting member 20 is resiliently movable upwards and downwards, and a tension force is applied to the string supporting member 20 during this taking up motion, which force acts to raise the string 8 upward, there exists a force to raise the string 8 between the bobbin 7 and the pull out hole 16. Consequently, the string 8 is imparted with suitable tension between the bobbin 7 and the string supporting member 20, such that the pull string can be taken up around the bobbin in a stretched state. When the pull string 8 is fully wound around the bobbin 7 by the complete unwinding action of the constant torque spring 5, the pull string 8 is pulled out to wind the constant torque spring 5 around the rotary member 3 to effect the next sound reproduction. When the pull string is pulled as stated above, the string supporting member 20 is lowered by being depressed against its resiliency by virtue of the stretched pull string 8.

Since the string supporting means 19 carrying the string supporting member 20 is constructed as a cantilever with its free tip end being deformable, the string supporting member 20 readily moves downward even by applying a slight extent of force.

In addition, the string 8, when stretched and inclined toward the pull out hole positioned below the level of the upper face of the record disc 13, will depress the record disc 13, it being resiliently integrally supported with the bobbin 7. Then the record disc 13 will descend. Thus, the reproduction stylus 12 is released from the contact with the upper face of the record disc 13, and the tone arm 14, carrying the reproduction stylus, is allowed to revert back to the starting point of sound reproduction.

When the operator takes his hand off the pull string after he has finished his pulling action, the string support member 20 is raised up by the resilient force imparted by the string support means 19, and the path of the string will become like that of a crank shape. In addition, the record disc 13, which has been released from the support given by the pull string 8, will move upwardly by the resilient force given by the stylus force spring 4, and enables the reproduction stylus 12 to be in contact with the upper face of the record disc 13.

Having, thus, described the invention, what is claimed is:

1. A pull string mechanism in a pull string type sound reproducing device comprising:
  (a) a turn table supported by an upstanding shaft disposed in a casing, the casing having a pull out hole formed on a side face thereof below the level of a record disc, the turn table being capable of being rotatable an axially movable along said shaft,
  (b) a speaker cone fixedly attached within said casing,
  (c) a record disc integrally mounted with said turn table and having at least one spirally formed record groove, and having a starting point and an end point of sound reproduction,
  (d) a tone arm being swingable along said record disc,
  (e) a pickup carried by said tone arm so as to be in contact with a cone head of said speaker cone, the pickup being provided with a sound reproducing stylus which confronts with and contacts the record disc,
  (f) a stylus force spring resiliently supporting said turn table and which imparts stylus force to said reproduction stylus through said turn table,
  (g) a constant torque spring for urging said turn table toward the predetermined direction of rotation,
  (h) a return spring for urging said tone arm toward the starting point of sound reproduction,
  (i) a bobbin supported by said shaft, the bobbin being integral with said turn table and said record disc both in the axial direction and the direction of rotation, a pull out hole formed on the side face of said casing at a portion below the upper face of said record disc,
  (j) a pull string one end of which attached to said bobbin and the other end being stretchable outside the casing through said pull out hole,
  (k) a string supporting means for supporting said pull string at the portion between the bobbin and said pull out hole and at a level higher than the upper face of said record disc; and
  wherein said string supporting means is resiliently movable only in an upward and downward direction and is disposed adjacent said pull out hole such that the path of the pull string from said pull out hole via the string supporting means and to said bobbin can follow a crank shaped path with the angle of turning being not larger than a right angle.

2. A pull string mechanism in a pull string type sound reproducing device as claimed in claim 1, wherein said string supporting means means resiliently movable only in an upward and downward direction is a plastic molding integrally formed with said housing such that the resilient property of the string supporting means can be utilized for resilient movement.

* * * * *